Sept. 16, 1958      F. J. CID      2,852,645

LIQUID LEVEL CURRENT CONTROL DEVICE

Filed April 5, 1956

INVENTOR.
FRED J. CID
BY
Oscar B Brumback
ATTORNEY

United States Patent Office 2,852,645
Patented Sept. 16, 1958

2,852,645

LIQUID LEVEL CURRENT CONTROL DEVICE

Fred J. Cid, Lodi, N. J., assignor to Bendix Aviation Corporation, Teterboro, N. J., a corporation of Delaware Application April 5, 1956, Serial No. 576,446

6 Claims. (Cl. 201—57)

This invention relates generally to liquid level current control devices.

The housing of conventional liquid level current controls is partially filled with an electrolyte so as to have a bubble at the top engaging with one or more electrodes. The shifting of this bubble, when the housing is tilted, varies the current flow through an electrode by exposing more or less of the electrode to the electrolyte. Difficulties have been experienced in the use of such devices on aircraft instruments heretofore due to the volumetric changes of the electrolyte with the wide range of temperatures encountered in the normal operation of the aircraft. Such volumetric changes of the electrolyte, by exposing more or less of the electrode to the electrolyte, varied the amount of current flow through the electrode without any tilting of the housing, thus tending to increase and decrease the sensitivity of any system associated with the device.

An object of the present invention therefore is to provide a novel liquid level current control device compensated for thermal changes.

Another object is to provide a novel liquid level current control device with means for maintaining the extent of electrode and electrolyte contact independent of the thermal changes in the liquid.

The present invention contemplates a liquid level current control device wherein an electrolyte partially fills a housing so as to leave at the top a bubble that moves upon rotation of the housing to differentially expose the surface of an electrode to the electrolyte and vary the current flow through the electrode and wherein provision is made for varying the position of the electrode relative to electrolyte in accordance with ambient temperature so as to maintain a predetermined electrode-electrolyte relationship despite volumetric changes of the electrolyte with temperature.

The foregoing and other objects and advantages of the invention will appear more fully hereinafter from a consideration of the detailed description which follows, taken together with the accompanying drawing wherein three embodiments of the invention are illustrated. It is to be expressly understood, however, that the drawing is for the purposes of illustration and description and is not be construed as defining the limits of the invention.

In the single sheet of drawing wherein like parts are marked alike:

Figure 2:
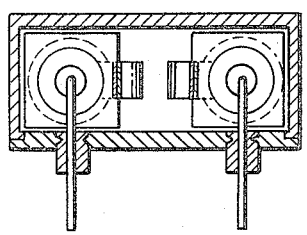
Figure 2 shows a sectional view taken along lines 2—2 of Figure 1.
Figure 1:
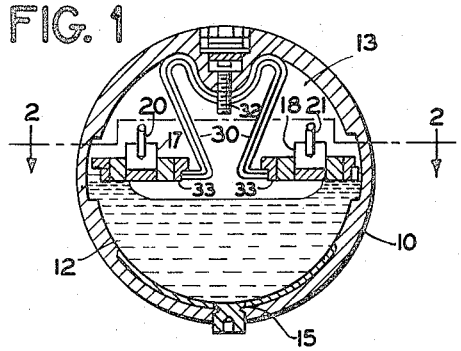
Figure 1 shows an elevational sectional view of the novel liquid level current control device of the present invention.

The novel current control device, Figure 1, comprises a generally cylindrical and hermetically sealed housing member 10 containing a suitable conducting liquid or electrolyte 12, such as sodium iodide and methyl alcohol. The electrolyte partially fills the container so as to leave at the top of the housing a bubble 13 of non-conducting material, such as air. An electrode 15 extends through the housing at the bottom and around the housing for a substantial distance contacting the liquid, and a pair of spaced electrodes 17 and 18 at the top of the housing extend into the bubble and normally in slight contact with the liquid. These electrodes are preferably made of carbon. Flexible conductors 20 and 21 extend through the side of the housing into engagement with electrodes 17 and 18.

As long as the housing is in the position illustrated wherein bubble 13 is in the normally centered position with respect to the electrodes so that both contact the electrolyte equally and the path of current flow from top electrode 17 to the bottom electrode 15 is substantially the same as the path from the other top electrode 18 to the bottom electrode 15. The resistance through the liquid, therefore, is the same and the flow through both electrodes is the same.

Figure 4:
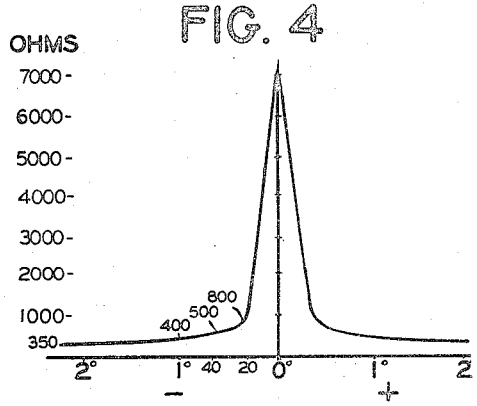
Figure 4 shows graphically the change in resistance value as the housing is tilted.
Figure 3:
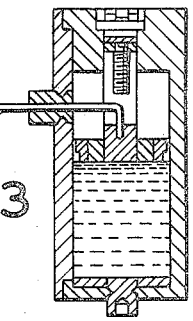
Figure 3 shows a sectional side view of Figure 1.

Should the housing be rotated clockwise, so that electrode 17 is lifted from the fluid and electrode 18 is immersed further into the fluid, the area of electrode 18 for current flow therefrom to the bottom electrode 15 is larger than the area for flow from the electrode 17 to the bottom electrode 15. Thus, the resistance from electrode 18 is less than the resistance from electrode 17, and this differential resistance varies the flow of current from the electrodes so that the current variation may be used to operate a suitable control system such as a system for erecting a gyroscope. Upon a tilt of the housing in the counter clockwise direction from normal position, the resistance from electrode 17 decreases in a similar manner. These changes in resistance values are shown graphically in Figure 4.

While the aforementioned liquid level current control device operates well on a limited range of temperatures, disadvantages are experienced when the device is to be used with aircraft instruments, due to the wide range of temperatures encountered in normal aircraft operation. These temperature changes cause the electrolyte to expand and contract, changing the initial relationship of the electrodes, and thereby changing the sensitivity of any system connected to the device. The present invention overcomes the foregoing disadvantages by sensing the ambient temperature to keep the relative positions of the electrodes and electrolyte independent of temperature effects.

In accordance with the present invention electrodes 17 and 18 are suspended from generally U-shaped bi-metallic spring elements 30 which are fixed to the housing by suitable means such as by screw 32. Spring 30 then supports insulating elements 33 which in turn support the electrodes 17 and 18. Bi-metallic element 30 is so arranged that the low expansion element is at the top and the high expansion element is at the bottom and the bi-metallic element is suitably sprayed or coated by a protective covering to prevent corrosion by the electrolyte.

The bi-metallic element 30 changes the position of the electrodes relative to the housing as the temperature changes. As the temperature decreases, the volume of the electrolyte decreases and tends to pull away from the electrodes. At the same time, the change in temperature also causes the bi-metallic element to shorten its effective length, thereby tilting the electrodes downwardly and into the electrolyte so as to maintain the electrodes in the same relationship to the electrolyte. As the temperature increases, the reverse effect takes place: the fluid expands in volume and the bi-metallic element tilts the electrodes upwardly toward the top of the housing to maintain the area of electrode-electrolyte contact constant.

Figure 5:
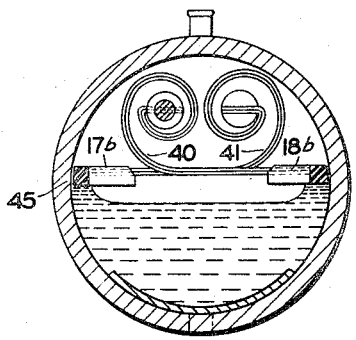
Figure 5 shows another embodiment of the invention.

Figure 5 illustrates another embodiment of the invention wherein the temperature compensation for the position of contacts 17b and 18b is provided by two bi-metallic elements 40 and 41 in the form of helically shaped springs. This embodiment has the advantage that the movement of electrodes 17b and 18b with change in temperature is parallel to the initial position of the contacts. In this embodiment, the excitation source is connected to the bi-metallic elements 40 and 41 and transmitted by the bi-metallic elements to the electrodes.

Figure 6:
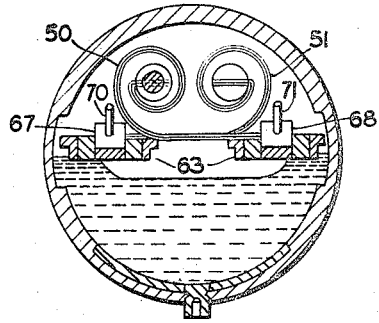
Figure 6 shows still another embodiment of the invention.

Figure 6 illustrates still another embodiment wherein the bi-metallic elements 50, 51 support insulated members as in Figure 1 in which the contacts 67, 68 are seated and thus are isolated from the contacts. Energy from a suitable source is supplied to contacts 67 and 68 by way of conduits 70, 71. The advantage of the last arrangement is that the springs 50, 51 are not required to serve as electrical transmitters.

The foregoing has presented a novel liquid level current control device assembly wherein the contacts are movable with changes in temperature so as to compensate for the expansion and contraction of the electrode with changes in temperature.

Although but three embodiments of the invention have been illustrated and described, various changes can be made in the design and arrangement of the parts without departing from the spirit and scope of the invention as the same will now be understood by those skilled in the art.

What is claimed:

1. A device comprising a tiltable housing, a current-conducting fluid and a non-conducting bubble filling said housing, an electrode having a surface area portion adapted to contact said fluid for current flow, said surface portion in contact with said liquid varying upon tilting of said housing from a normal position whereby the resistance to current flow is varied, and means for changing the position of said electrode relative to said housing in response to ambient temperature so that the portion of said electrode in contact with said fluid remains constant at said normal position despite changes in the volume of said fluid with temperature.

2. A device comprising a tiltable housing, a current conducting fluid partially filling said housing, an electrode having a surface portion adapted to contact said fluid for current flow, said surface portion varying upon said tilting of said housing from a normal position whereby the resistance to current flow is varied, the level of said fluid in said housing rising and falling with the volumetric changes of said fluid with temperature, and means for raising and lowering said electrode in said housing in response to ambient temperature so that the portion of said electrode in contact with said fluid remains constant at said normal position.

3. An electric control device comprising a tiltable housing, a current conducting fluid partially filling said housing, an electrode having a surface portion adapted to contact said fluid for current flow, said surface portion in contact with said liquid varying upon tilting of said housing from a normal position whereby the resistance to current flow is varied, said fluid changing in volume with temperature change whereby the level of said liquid rises and falls with temperature, and means responsive to ambient temperature for positioning said electrode so that the portion of said electrode in contact with said fluid remains constant at said normal position.

4. A device comprising a tiltable housing, a current-conducting fluid and a non-conducting bubble filling said housing, an electrode having a surface area, a portion of said area adapted to contact said fluid for current flow, said portion in contact with said liquid varying upon tilting of said housing from a normal position whereby the resistance to current flow is varied, and a bimetallic element supporting said electrode in said housing for changing the position of said electrode relative to said housing in response to ambient temperature so that said portion in contact with said fluid remains constant at said normal position despite volumetric changes of said fluid with temperature.

5. A device comprising a tiltable housing, a current conducting fluid and a non-conducting bubble filling said housing, an electrode surface having a portion adapted to contact said fluid for current flow, said portion in contact with said liquid varying upon said tilting of said housing from a normal position whereby the resistance to current flow is varied, and a U-shaped bimetallic element supporting said surface relative to said housing and flexing in response to ambient temperature changes so that said portion remains constant at said normal position despite volumetric changes in said fluid with temperature.

6. A device comprising a housing, a current-conducting fluid and a non-conducting bubble filling said housing, an electrode surface area portion adapted to contact said fluid for current flow, said portion varying upon the tilting of said housing from a normal position thereby varying the resistance to current flow, and a coil shaped bimetallic element supporting said electrode in said housing and winding and unwinding in response to ambient temperature so that the portion of said electrode in contact with said fluid remains constant at said normal position despite thermal volumetric changes of said fluid which tend to change the level of said fluid in said housing.

References Cited in the file of this patent

UNITED STATES PATENTS

| | | |
|---|---|---|
| 1,968,081 | Hunt | July 31, 1934 |
| 2,405,514 | Neild | Aug. 6, 1946 |
| 2,442,072 | Cole | May 25, 1948 |
| 2,713,727 | Balsam | July 26, 1955 |